H. W. IBBOTT.
BOURDON TUBE.
APPLICATION FILED JAN. 12, 1921.
1,385,133.
Patented July 19, 1921.
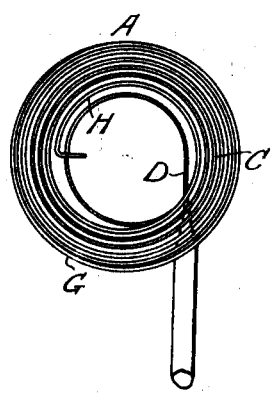
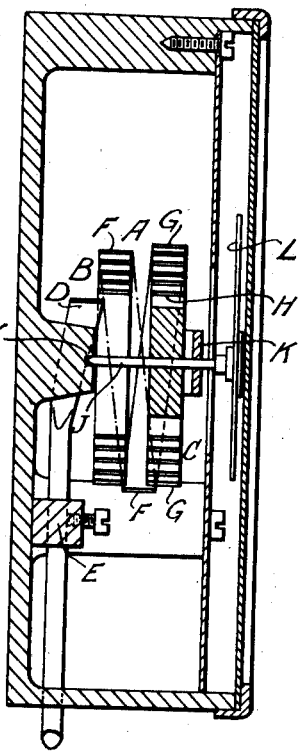
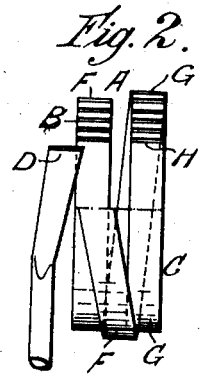
Inventor:-
Harold William Ibbott
By his Attorneys,
Baldwin & Wight

UNITED STATES PATENT OFFICE.

HAROLD WILLIAM IBBOTT, OF LONDON, ENGLAND, ASSIGNOR TO HENRY NOEL NEGRETTI, PAUL ERNEST NEGRETTI, MARCUS WILLIAM ZAMBRA, AND GEORGE JULIUS ZAMBRA, TRADING AS NEGRETTI AND ZAMBRA, OF LONDON, ENGLAND.

BOURDON TUBE.

1,385,133.   Specification of Letters Patent.   Patented July 19, 1921.

Application filed January 12, 1921. Serial No. 436,849.

*To all whom it may concern:*

Be it known that I, HAROLD WILLIAM IBBOTT, a subject of the King of Great Britain, residing at 38 Holborn Viaduct, London, England, have invented new and useful Improvements in Bourdon Tubes, of which the following is a specification.

This invention relates to Bourdon tubes of the type in which the flattened tube is formed into a coil of many convolutions and in which an index or pointer is fixed directly to one end of the coil.

One object of the invention is to cause the index or pointer to rotate truly about a given center where the index or pointer is not constrained by bearings and to prevent any undue pressure on the bearings when the index or pointer is so constrained.

Another object is to reduce to a minimum the space occupied by the Bourdon tube along the axis of rotation of the pointer, thereby also reducing the vibratory effect such as occurs in a coil wound into a long helix.

According to this invention a flattened tub is wound into the form of a double involute, the two coils are coaxial and the inmost convolution of one involute coil is fixed and the outmost convolution is connected to or formed in one piece with the outmost convolution of another involute coil, to the end of whose inmost convolution is attached a pointer.

The accompanying drawing shows a Bourdon tube made in accordance with this invention. Figure 1 is a front elevation, Fig. 2 a part transverse section and part side elevation of a Bourdon tube, and Fig. 3 is a transverse section of a Bourdon tube mounted and connected to a pointer.

A Bourdon tube A is formed in two involute coils B and C, and the inmost convolution D of the coil B is anchored at E, while the outmost convolution F of the coil B is formed in one with the outmost convolution G of the coil C. The inmost convolution H of the coil C is connected to a spindle J mounted in bearings K, K, and having at its end a pointer L.

What I claim is:—

1. A Bourdon tube wound into coaxial double involute coils, an anchorage for the inmost convolution of one involute coil, the outmost convolution being connected to the outmost convolution of the other coil, and a pointer to which the end of the inmost convolution of the second coil is connected.

2. A Bourdon tube wound into coaxial double involute coils, the outmost convolution of one coil being formed in one piece with the outmost convolution of the other coil, an anchorage for the inmost convolution of one coil, and a pointer to which the end of the inmost convolution of the second coil is connected.

3. A Bourdon tube wound into coaxial double involute coils, an anchorage for the inmost convolution of one involute coil, the outmost convolution being connected to the outmost convolution of the other coil, a shaft passing through both coils and connected to the end of the inmost convolution of the second coil, and a pointer fixed to the spindle.

In testimony that I claim the foregoing as my invention I have signed my name this 22nd day of December, 1920.

HAROLD WILLIAM IBBOTT.